United States Patent Office 3,141,877
Patented July 21, 1964

---

3,141,877
9α-HYDROXYPREGNANES AND PROCESS FOR PRODUCTION THEREOF
Josef Fried, Princeton, N.J., assignor to Olin Mathieson Chemical Corporation, New York, N.Y., a corporation of Virginia
No Drawing. Filed Nov. 16, 1961, Ser. No. 153,262
5 Claims. (Cl. 260—239.55)

This invention relates to the production of steroids. More particularly, the invention relates to a new method for the production of steroids and to intermediate compounds produced in the synthesis of those steroids.

In particular, the invention relates to the production of steroids represented by the formula:

(I)
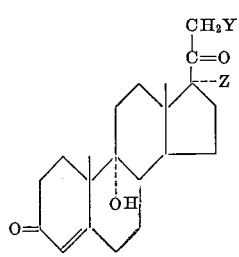

wherein Y represents hydrogen, fluorine, hydroxy or lower alkanoyl, and Z represents hydrogen or α-hydroxy.

The compounds of Formula I may be produced from starting materials of the general formula (II)
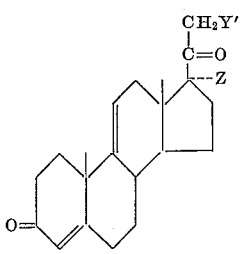

wherein Y' represents hydrogen, hydroxy or fluorine. It has been found that when the compounds of Formula I are ketalized in the 3- and 20-positions, epoxidation of the bisketals preferentially yields the 9α,11α-oxides and these oxides can then be reduced to the 9α-hydroxy ketals of Formula V by means of lithium aluminum hydride in tetrahydrofuran. Hydrolytic removal of the ketal groups yields the 9α-hydroxy compounds of Formula I.

Thus starting materials such as $\Delta^{4,9(11)}$-pregnadiene-3,20 - dione; $\Delta^{4,9(11)}$ - pregnadiene - 17α-ol-3,20-dione; $\Delta^{4,9(11)}$-pregnadiene-17α,21-diol-3,20-dione; or 21-fluoro-$\Delta^{4,9(11)}$-pregnadiene-17α-ol-3,20-dione may be converted to the corresponding 9α-hydroxy compound, i.e. 9α-hydroxy-$\Delta^4$-pregnene-3,20-dione; 9α,17α-dihydroxy-$\Delta^4$-pregnene-3,20-dione; 9α,21-dihydroxy-$\Delta^4$-pregnene-3,20-dione; 9α,17α,21 - trihydroxy-$\Delta^4$-pregnene - 3,20 - dione; or 21-fluoro - 9α,17α-dihydroxy-$\Delta^4$-pregnene-3,20-dione, respectively, by the sequence of steps which constitutes this invention.

In the first step of the synthesis, a compound of Formula II is converted to its cyclic bis-ketal, e.g., bis-ethylene ketal, of the formula (III)
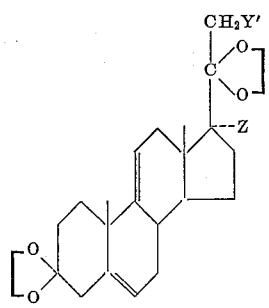

by reaction with a ketalizing agent such as ethylene glycol, propylene glycol, etc., in the presence of a strong acid such as p-toluenesulfonic acid.

The bis-ketal is then preferentially converted to the 9α,11α-oxide of the formula (IV)
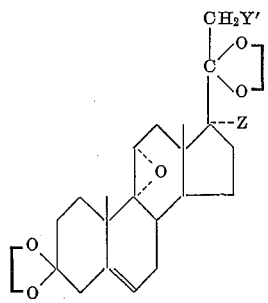

by treatment with an organic per-acid such as perbenzoic acid, perphthalic acid, peracetic acid or the like.

The compound of Formula IV is reduced with lithium aluminum hydride in boiling tetrahydrofuran (or other higher boiling ether, e.g., ethylene glycol dimethyl ether) to the compound of the formula (V)
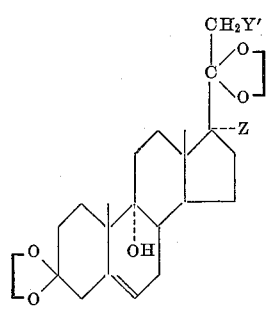

The ketal groups are then eliminated by hydrolysis, e.g. with a strong mineral acid such as sulfuric acid, in aqueous methanol, or the like to produce the 9α-hydroxy compounds of Formula I which are physiologically active compounds having glucocorticoid and progestational activity useful as substitutes for progesterone.

If an alkanoyl substituent in the 21-position is desired the requisite 21-hydroxy compounds are acylated with a lower alkanoyl anhydride in chloride in the presence of a tertiary base such as pyridine.

The following examples are illustrative of the invention. Temperatures are all expressed on the centigrade scale.

EXAMPLE 1

9,11-Dehydroprogesterone 3,20-Bisethylene Ketal

A solution of 10 g. of 9,11-dehydroprogesterone and 200 mg. of p-toluenesulfonic acid in a solution of 350 ml. of benzene and 80 ml. of ethylene glycol is heated at reflux with stirring using a Dean-Stark separator for 18 hours. The cooled solution is neutralized immediately by the addition of saturated sodium bicarbonate solution, the benzene phase washed three times with water, dried over sodium sulfate and evaporated to dryness. The crude residue on crystallization from acetone yields the bisketal possessing the following properties: M.P. 180–182°; $[\alpha]_D^{23}$ —6.4° (c., .58 in chlf.).

*Analysis.*—Calcd. for $C_{25}H_{36}O_4$ (400.54): C, 75.96; H, 9.06. Found: C, 75.46; H, 8.92.

EXAMPLE 2

9α,11α-Oxidoprogesterone 3,20-Bisethylene Ketal

To a solution of 9,11-dehydroprogesterone 3,20-bisethylene ketal obtained in Example 1 (2 g.) in 50 ml. of benzene are added at 0° 13.5 ml. (1.15 mole/mole of steroid) of a .43 molar solution of monoperphthalic acid in ether. The reaction mixture is kept in the refrigerator for 16 hours, following which it is washed with 80 ml. of a 4% sodium sulfite solution followed by dilute sodium bicarbonate and water. The chloroform-ether solution is then dried over sodium sulfate and the solvents evaporated in vacuo. Crystallization of the residue from acetone gives pure 9α,11α-oxidoprogesterone 3,20-bisethylene ketal possessing the following properties: M.P. 218–220°; $[\alpha]_D^{23}$ +9.5° (c., .43 in chlf.).

*Analysis.*—Calcd. for $C_{25}H_{36}O_5$ (416.54): C, 72.08; H, 8.71. Found: C, 71.73; H, 8.92.

When the perphthalic acid is replaced by perbenzoic acid the 9α,11α-oxide is obtained in equivalent yield.

EXAMPLE 3

9α-Hydroxyprogesterone 3,20-Bisethylene Ketal

A solution of 500 mg. of 9α,11α-oxidoprogesterone 3,20-bisethylene ketal and 1 g. of lithium aluminum hydride in 50 ml. of freshly distilled tetrahydrofuran is refluxed under nitrogen for 22 hours. The reaction mixture is treated with a saturated solution of sodium sulfate with external cooling and the resulting mixture extracted with chloroform. The chloroform extract is washed with water, dried over sodium sulfate and evaporated to dryness in vacuo. The crude residue (500 mg.) on crystallization from acetone furnishes pure 9α-hydroxyprogesterone 3,20-bisethylene ketal possessing the following properties: M.P. 168–170°; $[\alpha]_D^{23}$ —50.5° (c., .61 in chlf.)

*Analysis.*—Calcd. for $C_{25}H_{38}O_5$ (418.55): C, 71.74; H, 9.15. Found: C, 71.59; H, 8.95.

EXAMPLE 4

9α-Hydroxyprogesterone

To a solution of 50 mg. of 9α-hydroxyprogesterone 3,20-bisethylene ketal in 10 ml. of methanol is added .34 ml. of 8% sulfuric acid (w./v.) and the resulting solution refluxed on the steam bath for ½ hour. After cooling, sodium bicarbonate solution is added and the methanol evaporated in vacuo. The residual aqueous suspension is extracted with chloroform, the chloroform phase washed with water, dried over sodium sulfate and evaporated to dryness in vacuo. Crystallization of the crude residue from ethyl acetate and a second recrystallization from ethyl acetate gives analytically pure 9α-hydroxyprogesterone which possesses the following properties: M.P. 186–188°; $[\alpha]_D^{23}$ +186° (c., .57 in chlf.); $\lambda_{max}^{alc.}$ 242 m$\mu$ ($\epsilon$ =17,000); $\lambda_{max.}^{Nujol}$ 2.94, 5.87, 6.09 and 6.20$\mu$

*Analysis.*—Calcd. for $C_{21}H_{30}O_3$ (330.45): C, 76.33; H, 9.15. Found: C, 76.36; H, 9.08.

EXAMPLE 5

By substituting 9,11-dehydro-17α-hydroxyprogesterone for the 9,11-dehydroprogesterone in Example 1 and following the same sequence of processing as in Examples 2 to 4, 9,11-dehydro-17α-hydroxyprogesterone 3,20-bisethylene ketal, 9α,11α-oxido-17α-hydroxyprogesterone 3,20-bisethylene ketal, 9α,17α-dihydroxyprogesterone 3,20-bisethylene ketal, and 9α,17α-dihydroxyprogesterone are produced, respectively.

EXAMPLE 6

By substituting 9,11-dehydro-11-deoxycorticosterone for the 9,11-dehydroprogesterone in Example 1 and following the same sequence of processing as in Examples 2 to 4, $\Delta^{5,9(11)}$-pregnadiene-21-ol-3,20-dione 3,20-bisethylene ketal, 9α,11α-oxido-$\Delta^5$-pregnene-21-ol-3,20-diol 3,20-bisethylene ketal, 9α,21-dihydroxy $\Delta^5$-pregnene 3,20-dione 3,20-bisethylene ketal and 9α,21-dihydroxy-$\Delta^4$-pregnene 3,20-dione are produced, respectively.

EXAMPLE 7

By substituting $\Delta^{4,9(11)}$-pregnadiene-17α,21-diol-3,20-dione for the 9,11-dehydroprogesterone in Example 1 and following the same sequence of processing as in Examples 2 to 4, $\Delta^{5,9(11)}$-pregnadiene-17α,21-diol-3,20-dione 3,20-bisethylene ketal, 9α,11α-oxido-$\Delta^5$-pregnene-17α,21-diol-3,20-dione 3,20-bisethylene ketal, 9α,17α,21-trihydroxy-$\Delta^5$-pregnene 3,20-dione 3,20-bisethylene ketal and 9α,17α,21-trihydroxy-$\Delta^4$-pregnene 3,20-dione are produced, respectively.

EXAMPLE 8

By substituting 21-fluoro-$\Delta^{4,9(11)}$-pregnadiene-17α-ol-3,20-dione for the 9,11-dehydroprogesterone in Example 1 and following the same sequence of processing as in Examples 2 to 4, 21-fluoro-$\Delta^{5,9(11)}$-pregnadiene-17α-ol-3,20-dione 3,20-bisethylene ketal, 21-fluoro-9α,11α-oxido-$\Delta^5$-pregnene-17α-ol - 3,20 - dione 3,20-bisethylene ketal, 21-fluoro-9α,17α-dihydroxy-$\Delta^5$-pregnene-3,20-dione 3,20-bisethylene ketal and 21-fluoro-9α,17α-dihydroxyprogesterone are produced, respectively.

What is claimed is:

1. A process for the production of compounds of the formula

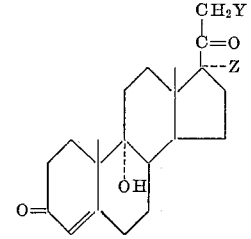

wherein Y represents a member of the group consisting of hydrogen, fluorine, hydroxy and lower alkanoyl, and Z represents a member of the group consisting of hydrogen and α-hydroxy, which comprises, in sequence, ketalizing in the 3- and 20- positions a compound of the formula

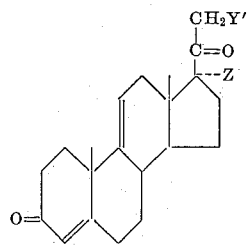

wherein Y' represents a member of the group consisting of hydrogen, fluorine and hydroxy, and Z represents a member of the group consisting of hydrogen and α-hydroxy, epoxiding the 3,20-bis ketal formed, reducing the 9α,11α-oxido product by means of lithium aluminum hydride in tetrahydrofuran and removing the ketal groups by hydrolysis with dilute acid.

2. A process for producing 9α-hydroxyprogesterone which comprises ketalizing 9,11-dehydroprogesterone in the 3- and 20-positions, converting the 3,20-bis ketal of 9,11-dehydroprogesterone thus formed to the 9α,11α-oxide by oxidation with an organic peracid, reducing the oxide with lithium aluminum hydride in tetrahydrofuran and removing the ketal groups by hydrolysis with dilute acid.

3. A compound of the formula

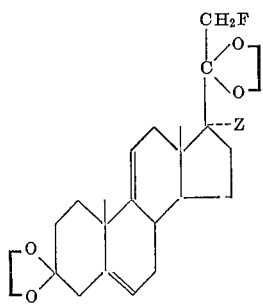

wherein Z represents a member of the group consisting of hydrogen and α-hydroxy.

4. A compound of the formula

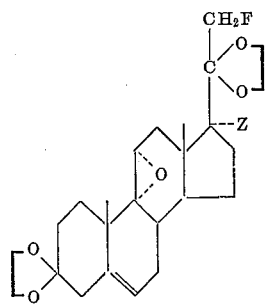

wherein Z represents a member of the group consisting of hydrogen and α-hydroxy.

5. 21 - fluoro - $\Delta^{5,9(11)}$ - pregnadiene-17α-ol-3,20-dione-3,20-bisethylene ketal.

References Cited in the file of this patent

UNITED STATES PATENTS

| | | |
|---|---|---|
| 2,732,383 | Bernstein et al. | Jan. 24, 1956 |
| 2,838,501 | Campbell et al. | June 10, 1958 |
| 2,840,578 | Perlman et al. | June 24, 1958 |
| 2,844,513 | Wettstein et al. | July 22, 1958 |
| 3,009,935 | Cutler | Nov. 21, 1961 |
| 3,040,065 | Schneider et al. | June 19, 1962 |
| 3,072,684 | Fried | Jan. 8, 1963 |

OTHER REFERENCES

Allen et al. J.A.C.S. 77, p. 1028–32 (1955).
Loewenthal: Tetrahedron, vol. 6, p. 287–91 (1959).